United States Patent [19]

La Violette

[11] 3,902,057
[45] Aug. 26, 1975

[54] SUBMERSIBLE TRAILER LIGHT

[75] Inventor: Paul A. La Violette, North Haven, Conn.

[73] Assignee: Paul Spinnato, Branford, Conn.; a part interest

[22] Filed: Oct. 9, 1973

[21] Appl. No.: 404,239

[52] U.S. Cl. .................. 240/8.3; 240/26; 340/93
[51] Int. Cl.² .................. B60Q 1/30; B60Q 1/56
[58] Field of Search .......... 240/8.3, 8.2, 8.22, 26, 240/7.1 F, 7.1 R, 57; 340/84, 93, 94, 95

[56] References Cited
UNITED STATES PATENTS

| | | | |
|---|---|---|---|
| 1,770,738 | 7/1930 | Handy | 240/8.2 |
| 2,088,501 | 7/1937 | Arbuckle | 240/8.3 X |
| 2,642,522 | 6/1953 | McDowell et al. | 240/8.3 X |
| 3,612,852 | 10/1971 | Bogossian | 240/8.3 |
| 3,739,168 | 6/1973 | Ploeger | 240/8.2 X |
| 3,748,643 | 7/1973 | Jacobs | 240/8.3 X |

Primary Examiner—Samuel S. Matthews
Assistant Examiner—Kenneth C. Hutchison
Attorney, Agent, or Firm—Steward & Steward

[57] ABSTRACT

An automotive-type accessory light fixture, such as a trailer taillight-stoplight combination, is disclosed. The fixture has waterproof construction of simplified design to permit complete submersion, as in launching of boats from boat trailers, without adverse effect on its operation. A preferred embodiment makes use of a transparent plastic casing which reduces the number of sealed joints required in comparison with prior fixtures.

3 Claims, 5 Drawing Figures

SUBMERSIBLE TRAILER LIGHT

BACKGROUND OF THE INVENTION

The invention disclosed here is directed to improved automotive type accessory light fixtures which are substantially waterproof to permit at least periodic submersion without adverse effect upon their operation.

More and more trailering of boats to different bodies of water, or between a home and the water, is common practice today with boating enthusiasts. Both the size and weight of the boats being used are increasing, so it is virtually essential that any trailer used for transporting the boat be capable of being run into the water at a launch site to a depth sufficient to permit the boat to be floated onto or off the trailer cradle. Such submersion occasions corrosion and poor conduction or possible shorting of exposed electrical contact points in the conventional accessory light fixtures, and frequent malfunctions arise on this account. Operable lights are of course required by motor vehicle regulations, and failure of a light to operate on account of such shorting and corrosion has been a frequent problem.

SUMMARY OF INVENTION

It is a purpose of this invention to provide an improved accessory light for trailers or other road vehicles which are required by safety regulations to be equipped with such fixtures. It is a particular purpose to provide a fixture which will assuredly operate, even though the vehicle and fixture may be submerged in water on frequent occasions and thus subject exposed electrical contact members to shorting and corrosion. It is a further objective to provide a light fixture meeting the foregoing use criteria, which is mechanically rugged to withstand rough usage, is convertible for different use requirements, yet is of simple design and economical construction. A further purpose is to provide a multi-light fixture which requires fewer sealed joints than prior similar devices. Such a light fixture is illustrated by the embodiment of the invention in a taillight/stoplight fixture shown in the accompanying drawings, in which FIG. 1 is an exploded view in perspective of a trailer light assembly comprising a taillight/stoplight combination and associated electrical conductor cable;

Figure 1:
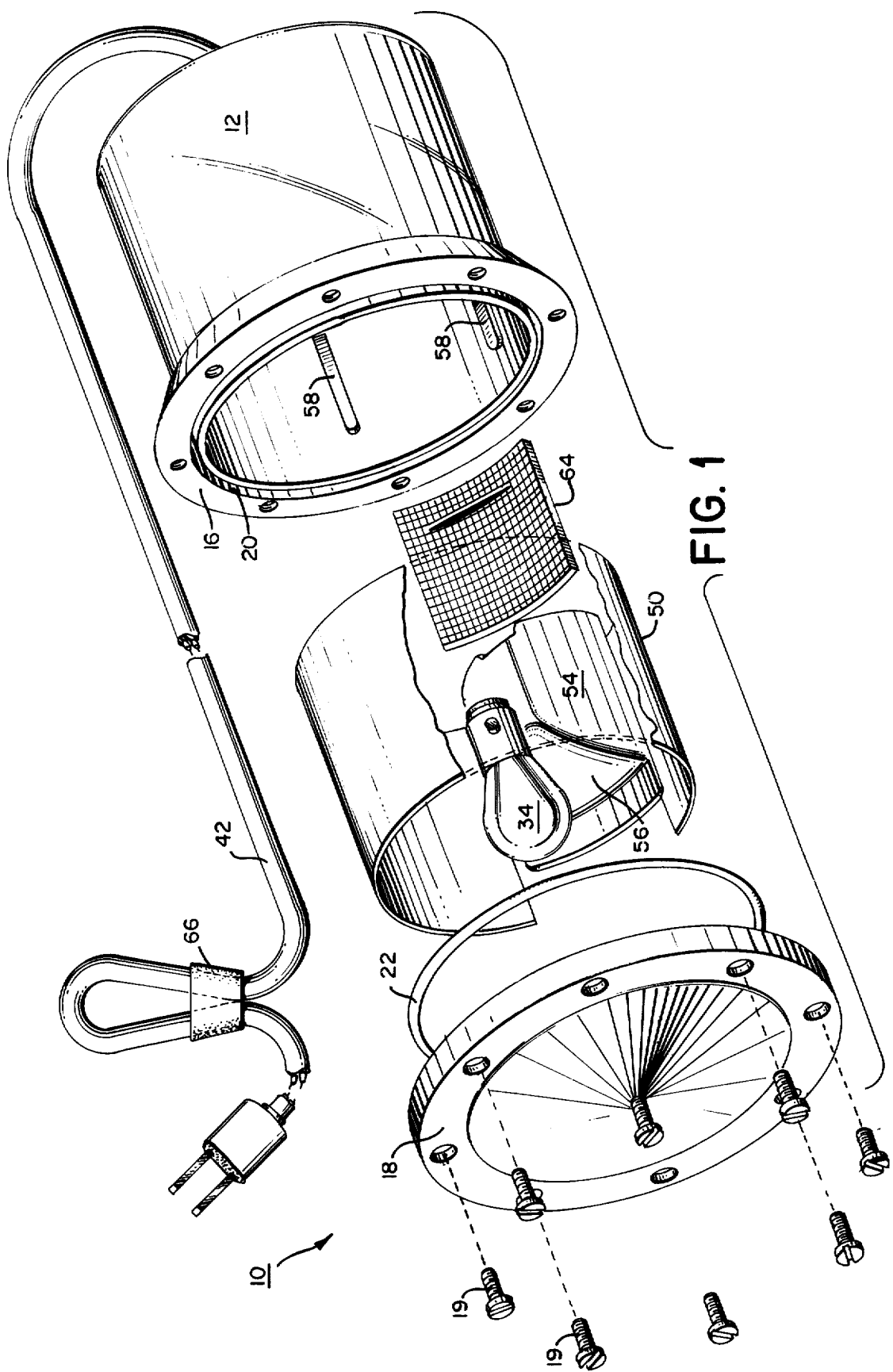
Figure 2:
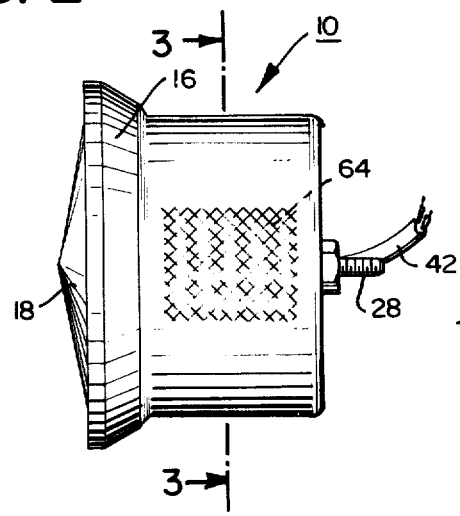
FIG. 2 is a view in side elevation of the light fixture.

Combination taillight/stoplight 10 seen in the drawings consists of a cup-shaped casing 12 having a closed end, or bottom wall 14, and a peripheral flange 16 surrounding the open mouth of the cup. Preferably as here shown the casing is of molded plastic, and as further explained, clear or transparent molded plastic is the material of choice. A lens plate 18 of appropriate translucent material is secured to casing 12 by screws 19 which are threadedly received in flange 16. A peripheral recess 20 is formed in flange 16, and a gasket 22 is received in recess 20 so as to provide a water-tight fit between lens plate 18 and casing 12. Screws 19 serve to fasten the lens plate to the casing.

A generally circular base plate 24 is received in casing 12 and is supported in spaced relation to bottom wall 14 by mounting posts 26 which in this case are shown as integrally formed with the casing. Plate 24 is secured in this position by a pair of large-headed screws 28 which pass through suitable apertures in plate 24 and through holes bored in posts 26, projecting rearwardly from the rear face of the casing. Retaining nuts 29 clamp the plate securely to the mounting posts 26, and an O-ring gasket 30 is positioned under the head of each screw 28 to help form a water-tight seal between the screws and the casing. Sealant may also be used between the shanks of the screws and the walls of the bores in posts 26.

Figure 5:
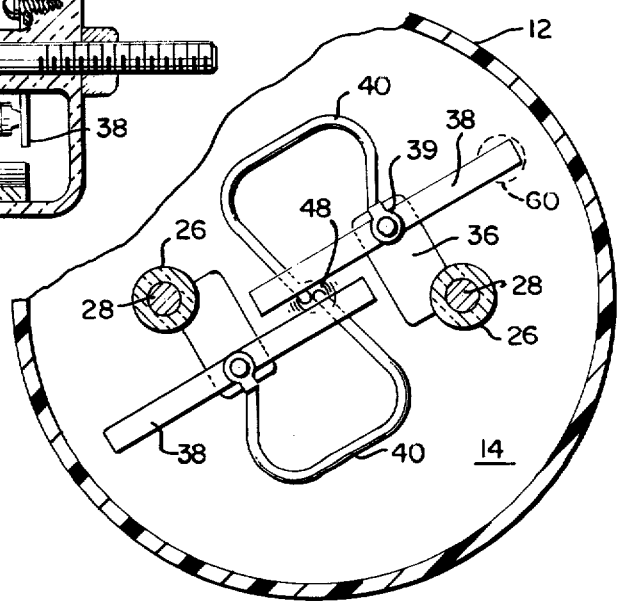
FIG. 5 is a fragmentary sectional view taken on line 5—5 of FIG. 4, looking in the direction of the arrows.

Plate 24 is formed to provide a central socket 32 of standard bayonet type for the reception of the base of a conventional dual filament lamp bulb 34. As seen more particularly in FIG. 5, a pair of bosses 36 is provided on rear wall 14, the upper faces of which define a plane intermediate base plate 24 and the wall. Bosses 36 are located on opposite sides of socket 32, and a spring contact strip 38 is secured to the upper face of each boss, as by screws 39, to project laterally from either side of the boss in the plane defined by the boss faces. Spring contact strips 38, moreover, extend generally parallel to each other, and underlie socket 32, whereby each strip may contact one of the two button terminals provided in the base of the conventional dual filament lamp bulb 34. Screws 39 serve also as terminal screws for securing separate electrical conductors 40 to the respective strips 38. Conductors 40 are part of a cable 42 which includes an enclosing flexible plastic tubing 44. The near end of tubing 44 is received on nipple 46 formed in bottom wall 14, being cemented, clamped or otherwise secured to the nipple to provide a water-tight seal at this point. Bore 48 in nipple 46 permits passage of conductors 40 through wall 14 into the casing. Ground connection for completing the circuit through lamp bulb 34 is effected by mounting screws 28. These are bolted to a metal part of the frame of the trailer in mounting the fixture, thus serving not only for electric connection through base plate 24 to socket 32, but as the means for mechanically mounting the fixture on a trailer.

In the preferred embodiment in which casing 12 is formed of clear plastic, an opaque mask 50 in the form of a strip of chrome plated sheet metal is bent to form a cylinder of a height equal to the depth of casing 12. This is inserted in the casing and because of its natural resilience, the strip tends to unbend and thus lies closely against the side wall of the casing. Base plate 24 serves as a reflector at the back of the light tube formed, while strip 50 serves as an internal side reflector, as well as presenting a bright chrome exterior appearance to the casing where it is clear plastic.

Most regulations governing the lighting of vehicles require that not only shall there be a taillight visible from directly behind the vehicle, but that lateral warning also be provided by an independent light source radiating from each side of the vehicle. In the light fixture here disclosed, provision is readily made for incorporating such independent lateral light source without requiring a separate lens and the additional sealed joint this entails.

Figure 3:
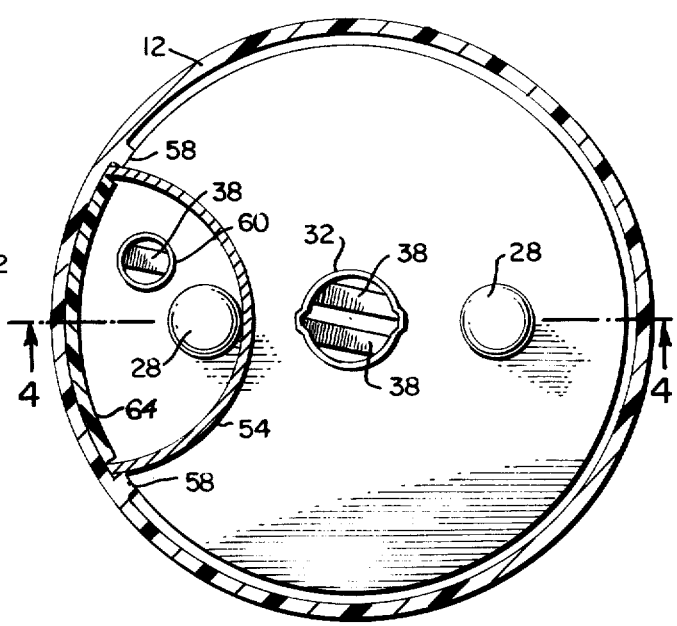
FIG. 3 is an enlarged sectional view in the direction of the arrows taken on line 3—3 of FIG. 2.
Figure 4:
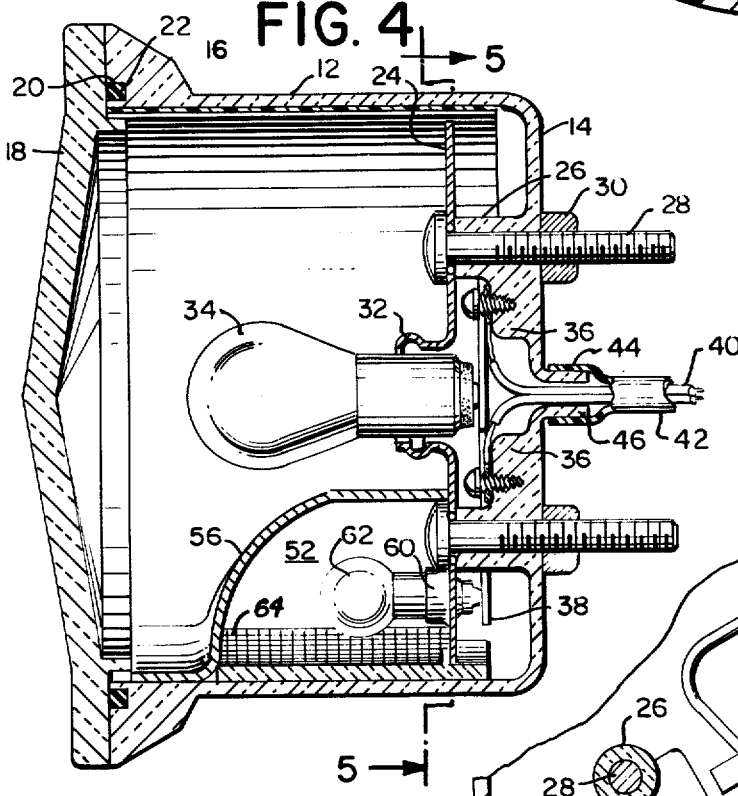
FIG. 4 is a sectional view taken on line 4—4 of FIG. 3, looking in the direction of the arrows.

A separate compartment 52, as shown more particularly in FIGS. 3 and 4, is formed in casing 12 by inserting a generally semi-cylindrical partition member 54.

This can conveniently be formed of molded opaque plastic or pressed metal and includes an arcuate end closure 56 at its axially outer end. Guide ribs 58 molded in the inner wall of casing 12 serve as locating stops between which the semicircular arc of partition 54 is subtended when positioned in casing 12. At its axially inner end, partition member 54 is open and when assembled in casing 12, the end of the partition member abuts base plate 24. Within the arc circumscribed by the partition, base plate 24 is formed to provide an auxiliary lamp socket 60, generally similar to socket 32. Furthermore this socket is positioned adjacent a mounting post 26 and boss 36 so as to be in line with an extension of a spring contact strip 38 projecting oppositely from its contact with lamp 34. Thus, lamp 62, when inserted in socket 60, is placed in electrical parallel with the normal taillight circuit of lamp 34. See more particularly FIG. 5.

Lateral transmission of light from lamp 62 is effected by terminating opaque masking strip 50 at guide ribs 58 of the casing, so that light from lamp 62 may be emitted laterally through the transparent casing. A lens 64 may be placed along the inner wall of the casing within compartment 52 to modify the light transmitted, and also to act as a reflector, but such modifying lens introduces no additional sealed joint in the casing.

In order to complete the waterproofing of the light fixture where external power is supplied to the light, the flexible plastic tubing enclosing electrical conductors 40 meeting the light is run to the far end of the electrical conductors which are made of sufficient length to enable a portion of the conductor cable to be attached at some point on the trailer normally above any level to which the trailer might be submerged. A bight or loop in cable 42 is formed at this point, as by taping 66, thereby forming a hydraulic trap to prevent water from seeping interiorly along cable 42, even if the free terminal end should by reason of its connection at a low point on the tow vehicle, become submerged during a launching or retrieval operation.

It will be apparent that the invention can also be embodied to advantage in a battery-powered, i.e. self-contained, water-proof light fixture where it is desired to provide such a unit having multi-light source capability, yet avoiding the need for separate lens-sealing requirements.

What is claimed is:

1. In a submersible trailer light
a cup-shaped casing formed of molded clear transparent material and having a closed bottom and a flange surrounding the open mouth of the cup, a lens plate of translucent material covering said mouth, and means for securing said lens plate to said flange to form a watertight joint about the mouth of said casing;

said casing having a pair of mounting posts projecting upwardly from the bottom wall thereof, and a pair of terminal bosses of lesser height than said posts, each of said posts being formed with an axial hole which passes through the bottom wall, each of said bosses having a spring contact strip mounted thereon to project outwardly therefrom generally parallel to the bottom wall of said casing in spaced relation thereto;

said casing being formed exteriorly on its bottom wall with a nipple, and a bore passing through said nipple into said casing;

a base plate received within said casing and supported on said mounting posts generally parallel to but spaced from said bottom wall and said spring strips, screws passing through said base plate and the axial holes in said posts to secure said plate in said casing and form external mounting means for said light, gasket means forming a water-tight fit between said screws, base plate and posts; said base plate having a pair of sockets for receiving and removably retaining lamp bulbs therein, each of said sockets overlying at least one of said spring contact strips;

electrical conductor means interconnecting said lamp sockets and at least one of said mounting screws, and other conductor means connected to each of said spring contact strips and passing outwardly through said nipple for an extended length, and a flexible tubing enclosing said other conductor means throughout its length, the near end of said tubing being received on said nipple and forming a water-tight joint therewith;

a removable flexible sheet mask positioned on the inner periphery of the casing wall to blank out transmission of light through any selected arc of the casing side wall;

an opaque shroud member of generally semicylindrical shape, open at its axially inner and closed at its axially outer ends, respectively, said shroud member being retained in said casing adjacent the side wall thereof with its open end abutting said base plate to encompass one of said lamp sockets, whereby to form an enclosure with the unmasked arc of said case side wall.

2. A submersible trailer light as defined in claim 1, wherein said flexible sheet mask is reflective on at least its interior surface.

3. A submersible trailer light as defined in claim 1, which further includes an arcuate lens insert removably trapped by said shroud adjacent the unmasked arc of said casing side wall.

* * * * *